Figure 1:
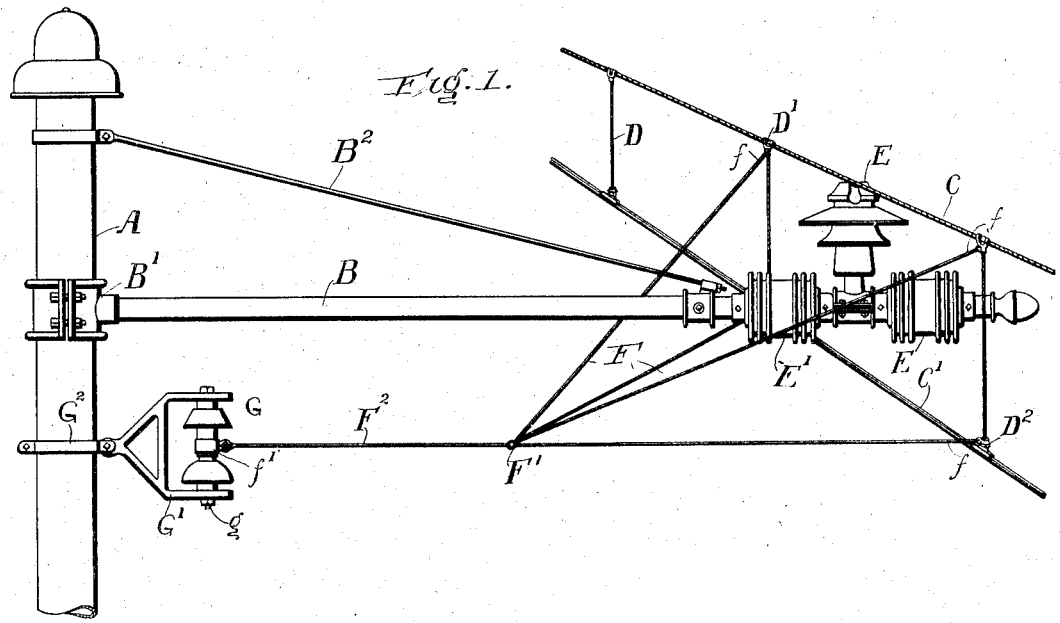

No. 864,252. PATENTED AUG. 27, 1907.
E. P. MORRIS.
CATENARY SUSPENSION BRACKET.
APPLICATION FILED OCT. 20, 1906.

Witnesses
Jno. W. Bache
Harvey S. Jones

Inventor
Elmer P. Morris,
By his Attorney
T. J. Johnston

UNITED STATES PATENT OFFICE.

ELMER P. MORRIS, OF EAST ORANGE, NEW JERSEY.

CATENARY SUSPENSION-BRACKET.

No. 864,252.

Specification of Letters Patent.

Patented Aug. 27, 1907.

Application filed October 20, 1906. Serial No. 339,840.

*To all whom it may concern:*

Be it known that I, ELMER P. MORRIS, a citizen of the United States, residing in East Orange, in the State of New Jersey, have invented certain new and useful Improvements in Catenary Suspension-Brackets, of which the following is a specification.

My present invention relates to an improved suspension system for trolley wires of electric railways, and has particular relation to those systems now known as "catenaries"; in which a messenger cable of considerable strength is attached to points of support, usually poles at considerable distances apart, and a trolley wire is then fastened to the messenger cable by supports of different lengths so arranged that it is carried in substantially a horizontal plane. This form of construction is peculiarly desirable in high speed work and for alternating current railways, in which the trolley wire is supplied with current at high potential, which renders it liable to destructive arcing when the trolley leaves the wire.

I prefer to connect the trolley wire and the catenary cable by pieces of metal with clamps of such form, at least upon the working conductor, as will not interfere with the passage of the trolley; this restriction is unnecessary with the messenger cable, and the clamps there used may be of any desired form. I rely for insulation of the whole structure from the ground upon insulators carried upon an improved bracket arm, the whole structure being arranged as more fully hereinafter described, so as to be capable of only very limited lateral movement at the pole. I have also adopted safeguards against a short-circuit which will presently be described, and in the event of the breaking of the messenger cable precautions which will prevent its falling to the ground and endangering passengers.

To accomplish the ends pointed out, I carry the messenger cable upon a high-potential insulator affixed to the end of the bracket arm; and I secure upon the bracket arm secondary insulators arranged with grooves parallel to the course of the conductor and which act as traps for the messenger should it by any means be thrown from the primary high-potential insulator. These secondary insulators are such as are described in my Patent No. 803,010 issued October 31st, 1905. To secure the messenger and working conductor against undue oscillation I provide a bridle, extending to but insulated from the pole which supports the bracket-arm. This bridle is practically pyramidal in form, the rods extending from its apex to the points of conjunction of the supports with the messenger cable and the working conductor, adjacent to each side of the insulator. Attached to the pole is a yoke carrying between its arms an insulator of approved construction, having a bolt passing through it so as to furnish sufficient strength, and to this insulator the bridle is secured.

Its particular construction will be more fully described hereafter.

Figure 2:
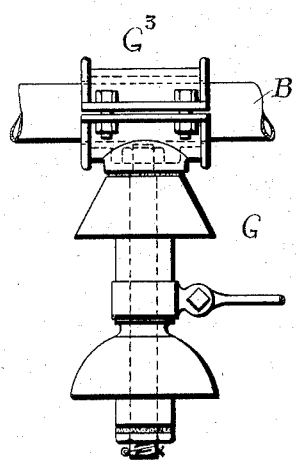
Figure 3:
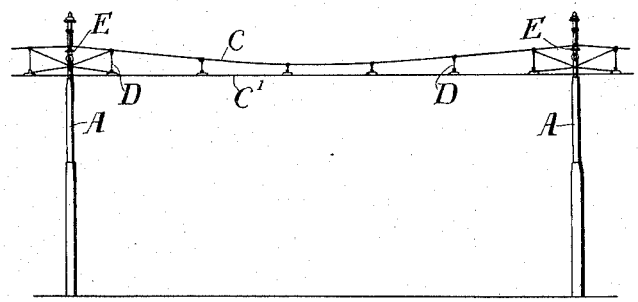

Referring now to the drawings, Figure 1 is a conventional perspective, showing the details of the invention, and how it may be embodied. Fig. 2 is an enlarged detail, showing the tie secured to the bracket-arm. Fig. 3 is a diagrammatic side elevation on a reduced scale.

In the figures, A is the pole, which is shown as composed of iron, but of course may be made of wood as is common in many places.

B is the bracket-arm secured by the collar $B^1$ to the pole, and provided with the guy $B^2$.

C is the messenger cable, and $C^1$ the working conductor or trolley wire. I prefer to make the messenger of copper cable since this gives a large current carrying capacity and is sufficiently strong and stiff for supporting the trolley-wire. The working conductor is preferably the well known "figure-of-eight" trolley wire, which I prefer to employ because it has an unbroken under surface with which the trolley, whether of the common wheel or the bow form often employed, may be used conveniently.

D is a strap or rope of metal which secures the working conductor to the messenger and $D^1$ is the clamp which surrounds the latter; $D^2$ is a clamp for attaching the strap to the working conductor. Sometimes lengths of iron pipe may be substituted for the straps.

E is a high-potential insulator, across which the messenger is laid in the groove prepared for it, and to which it may be secured, if desired, by a wire tie in well known ways.

$E^1$ $E^1$ are the secondary insulators, fully described in my patent already referred to. The high-potential insulator E is provided with petticoats which prevent the drip from falling upon the portion of the bracket-arm upon which the insulator is secured; and the insulator itself, in connection with the secondary insulators surrounding the bracket-arm, furnishes a long creeping surface, so that substantially no waste of current will occur in wet weather.

F is the bridle to which I have referred. It is constructed of steel rods extending from the apex $F^1$ to each of the clamps adjacent to the brackets which secure the straps D to the conductor and messenger, at the points $f f$. From the apex $F^1$ a tie $F^2$ extends to the insulator G, held in a vertical position by the yoke $G^1$, secured by the collar $G^2$ to the pole A. This insulator is also provided with petticoats, one above the tie $F^2$, and one below it, so that both the tie and the lower part of the yoke are protected from moisture as far as possible; the tie is connected to the insulator by the collar $f^1$ and a bolt $g$ secures the insulator in place in the yoke.

In Fig. 2 I show how the insulator G, may conveniently be secured by a collar G³ to the bracket-arm in some cases. This is not as good a construction because the device is better when the tie F² is further below the arm B, but it may under some conditions be used.

In Fig. 3, I indicate diagrammatically the arrangement of short and long straps D, which connect the messenger and the trolley wire together so that the latter is supported in approximately a single horizontal plane.

The structure thus described is, in commercial use, well adapted to its purpose. I have not deemed it necessary to illustrate more than one bracket-arm, the method of employing these suspensions being well understood by those skilled in the art.

Having thus described my invention, what I claim and wish to protect by Letters-Patent of the United States is:

1. A catenary suspension for an electrical railway, consisting of a messenger cable supported upon insulators at selected points, secondary insulators arranged to trap the cable and prevent its making contact with an uninsulated portion of its support, and electrical connections of different lengths supporting the working conductor from the messenger in substantially a horizontal plane.

2. A catenary suspension for the working conductor of an electric railway, comprising a messenger cable carried upon insulators, and a conductor suspended from the messenger in substantially a horizontal plane by electrical connections, and a bridle affixed to both the cable and the conductor at the connections between them, adjacent to the insulator, and upon each side thereof, the bridle being anchored to the insulator support.

3. In a catenary suspension for an electric road, the combination with a pole and bracket, of a messenger cable and working conductor with electrical connections between them and a bridle consisting of rods extending from a common junction to the ends of the connections adjacent to the bracket, with a tie extending from said junction to the pole.

4. In a catenary suspension for an electric road, the combination of a pole and bracket, a messenger cable, pole and working conductor and connections between the working cable and conductor, with a bridle consisting of rods extending from a common junction to the ends of the connections between the cable and conductor which are adjacent to the bracket, and a tie extending from said junctions to the pole and insulated therefrom.

In witness whereof I have hereunto set my name in the presence of two witnesses.

ELMER P. MORRIS.

Witnesses:
T. J. JOHNSTON,
IRVING M. OBRIEGHT.